US006425363B1

United States Patent
Lieske et al.

(10) Patent No.: US 6,425,363 B1
(45) Date of Patent: Jul. 30, 2002

(54) INDUCTION SYSTEM FOR SUPPLYING AN INTERNAL COMBUSTION ENGINE WITH COMBUSTION AIR

(75) Inventors: Stefan Lieske, Wolfenbüttel; Holger Scholz, Braunschweig, both of (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/601,309
(22) PCT Filed: Jan. 8, 1999
(86) PCT No.: PCT/EP99/00065
§ 371 (c)(1),
(2), (4) Date: Jul. 31, 2000
(87) PCT Pub. No.: WO99/39088
PCT Pub. Date: Aug. 5, 1999

(30) Foreign Application Priority Data

Jan. 31, 1998 (DE) .......................................... 198 03 804

(51) Int. Cl.⁷ ............................................... F02M 35/10
(52) U.S. Cl. ................................................... 123/184.21
(58) Field of Search ....................... 123/184.21, 184.55, 123/184.56

(56) References Cited

U.S. PATENT DOCUMENTS

| 4,957,071 A | * | 9/1990 | Matsuo et al. ......... 123/52 MV |
| 5,056,473 A | | 10/1991 | Asaki et al. |
| 5,081,962 A | | 1/1992 | Kurokawa et al. |
| 5,309,883 A | | 5/1994 | Pischke |
| 5,632,239 A | | 5/1997 | Patyi et al. |

FOREIGN PATENT DOCUMENTS

| EP | 521 535 | 1/1993 |
| EP | 790 393 | 8/1997 |

OTHER PUBLICATIONS

Article entitled Honda Develops 3.5 liter V6 24–Valve SOHC Engine with 3–Stage Variable Intake Mechanism taken from Asia–pacific Automotive Report–Volume 234, pp. 24–25.
0 710 2979, Apr. 18, 1995, Patent Abstracts of Japan.
63 30 756, Nov. 29, 1994, Patent Abstracts of Japan.
60–19914 Feb. 1, 1985, Patent Abstracts of Japan.

* cited by examiner

Primary Examiner—Tony M. Argenbright
Assistant Examiner—Katrina B. Harris
(74) Attorney, Agent, or Firm—Cohen, Pontani, Lieberman & Pavane (57) ABSTRACT

A suction system for supplying an internal combustion engine with combustion air, especially in an automobile. The suction system includes at least one separate air collector from which individual suction pipes each lead to the air inlets of the respective cylinders of the internal combustion engine. The suction pipes are configured as ram tubes for the top speed areas of the internal combustion engine. At least one compensation flap is located in the air collector. When closed, the compensation flap divides the air collector to provide a long pre-suction section and when open, instead of a long pre-suction section provides an air collector with an increased volume.

13 Claims, 6 Drawing Sheets

INDUCTION SYSTEM FOR SUPPLYING AN INTERNAL COMBUSTION ENGINE WITH COMBUSTION AIR

BACKGROUND OF THE INVENTION

1. Field of the Invention

The invention relates to an induction system for supplying an internal combustion engine with combustion air, in particular for a motor vehicle, having at least one separate air manifold, from which in each case cylinder-specific induction pipes lead to air intakes of cylinders of the internal combustion engine.

2. Discussion of the Prior Art

It is known from Asia-Pacific Automotive Report, volume 234, May 4, 1996, to use two switchable valves to switch a tuned pipe long or short and thus to change a corresponding tuned length as desired. However, this system only switches between two different tuned states, ensuring optimum cylinder filling only over a limited speed range. For this reason, a third switchable valve is provided, which in the open state increases a cross section of flow for combustion air accordingly, so that at high revs a high mass flow is ensured. However, this completely destroys any tuned effect in the induction system for the combustion air and does not provide any kind of assistance for-filling the cylinders.

SUMMARY OF THE INVENTION

The present invention is therefore based on the object of providing an induction system of the above type in which the above drawbacks are overcome and of achieving optimum cylinder filling with combustion air over the maximum possible speed range of the internal combustion engine.

To this end, according to the invention the induction pipes are designed as ram pipes for upper speed ranges of the internal combustion engine and at least one balancing valve is arranged in the air manifold, which valve optionally, in the closed position, divides the air manifold to form a long preintake length or, in the open position, instead of a long preintake length provides an air manifold with an increased volume.

This has the advantage that, in a structurally simple, space-optimized manner, it is optionally possible to achieve a tuned-intake charging for low speed ranges of the internal combustion engine, by closing the balancing valves, or to achieve a ram-type charging for high speed ranges of the internal combustion engine, by opening the balancing valves.

For internal combustion engines with cylinders which are arranged on separate cylinder banks, for example in the case of an 8-cylinder engine in a V or double-V arrangement or VR arrangement, it is particularly advantageous to provide two separate air manifolds.

An additional tuned state for a middle speed range of the internal combustion engine is achieved by the fact that in each case two air manifolds are connected to one another via a tuned pipe, the tuned pipe having a tuned valve for optionally opening or closing the pipe in such a manner that the respective air manifolds are optionally connected or not connected to one another via the tuned pipe.

In a preferred embodiment, the internal combustion engine has a crankshaft with a 180° crank angle and n cylinders, in which, to ensure that there is no disruption to the induction processes, the cylinders 1 to n/2 are connected to a first air manifold via respective induction pipes and the cylinders (n/2+1) to n are connected to a second air manifold via respective induction pipes.

Preferably, n=4 or 8. In the latter case, an ignition sequence for the cylinders 1 to 8 is, for example, as follows: 1-5-2-6-4-8-3-7.

A particularly small space requirement as the result of a compact design is achieved by the fact that the cylinders are distributed, for example, over at least two cylinder banks, in particular over two double cylinder banks, each air manifold supplying cylinders of one cylinder bank or one double cylinder bank with combustion air, and the induction pipes of the first air manifold crossing those of the second air manifold.

In this case, the balancing valve and the induction pipes of an air manifold are expediently arranged in such a manner that, when the balancing valve is closed, there is an increasing induction length for the cylinders which are supplied in each case via the induction pipes as the cylinder number increases.

In another preferred embodiment, the internal combustion engine has a crankshaft with a 90° crank angle and n cylinders, in each case n/2 or (n−1)/2 of the cylinders being connected to a first air manifold via respective induction pipes and the other n/2 or (n+1)/2 cylinders being connected to a second air manifold via respective induction pipes.

Expediently, n=4 or 8. In the latter case, an ignition sequence of the cylinders 1 to 8 is, for example, as follows: 1-5-7-4-8-3-2-6.

In this case, to ensure that there is no disruption to the induction processes, the cylinders 1, 2, 7, 8 are preferably connected to the first air manifold and the cylinders 5, 6, 3, 4 are preferably connected to the second air manifold.

A particularly small space requirement as a result of a compact design is achieved by the fact that the cylinders are distributed over at least two cylinder banks, in particular over two double cylinder banks, the air manifolds being arranged in each case adjacent to one cylinder bank or double cylinder bank and opposite to the other cylinder bank or double cylinder bank, in which arrangement some of the induction pipes of one air manifold lead to the opposite cylinder bank or double cylinder bank, crossing over the induction pipes of the other air manifold, and some of these induction pipes lead to the adjacent cylinder bank or double cylinder bank in an overhead arrangement.

BRIEF DESCRIPTION OF DRAWINGS

Further features, advantages and advantageous configurations of the invention are given in the following description of the invention with reference to the appended drawings, in which.

DETAILED DESCRIPTION OF THE PREFERRED EMBODIMENTS

Figure 1:
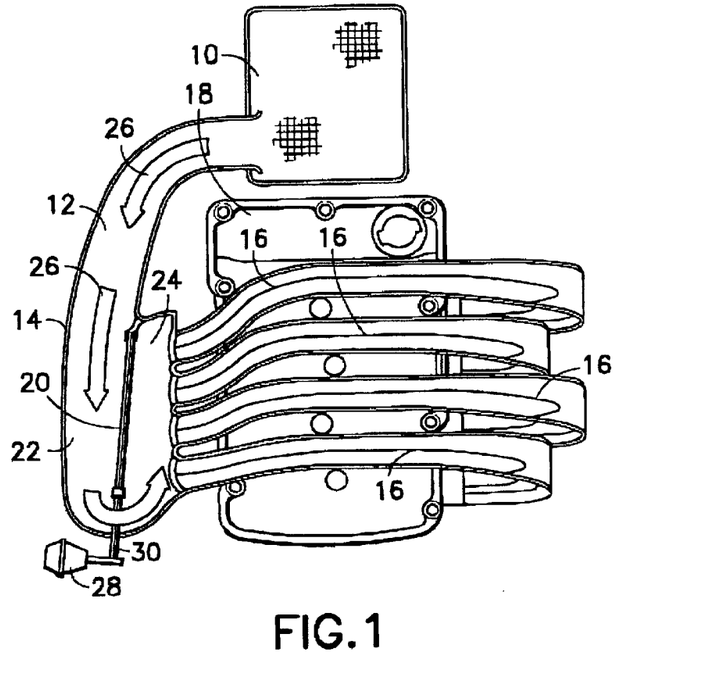
FIGS. 1 and 2 show a first preferred embodiment of an induction system according to the invention, in a partially sectional plan view, in each case in different switching states.
Figure 2:
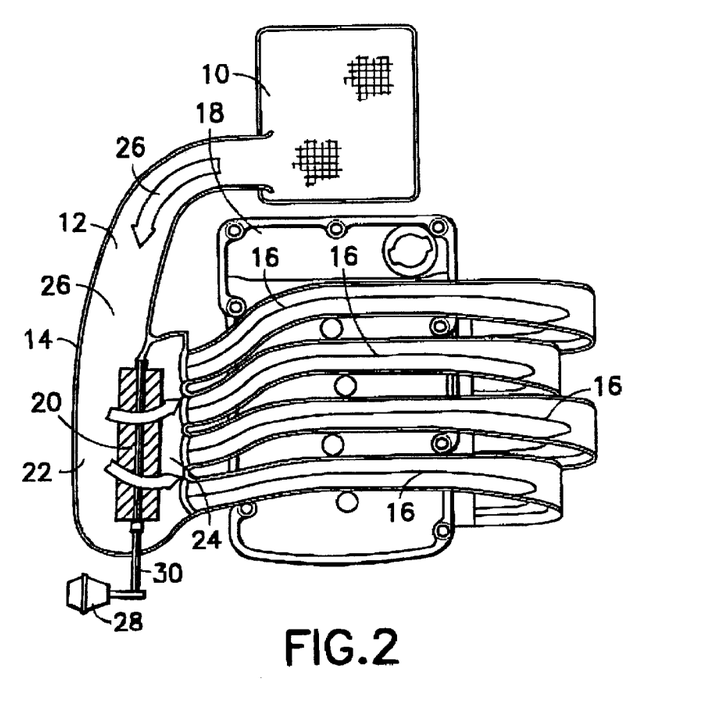

The first preferred embodiment of an induction system according to the invention which is illustrated in FIGS. 1 and 2 comprises, as seen in the direction of flow, an air filter 10, a preintake length 12, an air manifold 14 and cylinder-specific induction pipes 16 which lead to air intakes (not shown) for cylinders of an internal combustion engine 18. A balancing valve 20 is arranged rotatably in the air manifold 14, in such a manner that, in the closed position, as shown in FIG. 1, it divides the air manifold 14 into two parts. A chamber 22 of the air manifold 14 which is on the air filter side in this case additionally acts as a preintake length, while a chamber 24 which is on the induction pipe side acts as an air manifold of reduced volume. In this switching position shown in FIG. 1, combustion air which is drawn in by the internal combustion engine 18 flows in the direction of the arrows 26 along an extended preintake length, and the dimensions of the components are selected in such a manner that tuned-intake charging results for a lower speed range of the internal combustion engine 18, since reflection of pressure waves at the air filter system 10 and in the preintake length controls the fluid dynamics.

In the second switching position illustrated in FIG. 2, the balancing valve has been rotated through 90 degrees by a drive 28, such as for example an electric motor, resulting in an air manifold 14 of increased volume comprising the sum of chambers 22 and 24 and, furthermore, reducing the preintake length 12. The induction pipes 16, which are expediently designed and dimensioned as ram pipes for the internal combustion engine 18 in an upper speed range, now control the flow of the combustion air which is drawn in by the internal combustion engine, resulting in ram-pipe charging. In this switching position, therefore, the reflection of the pressure waves at the air manifold 14 determines the system performance.

The balancing valve 20 does not necessarily have to be arranged in a single piece in the air manifold 14. Rather, it is also possible for the balancing valve to be divided into two or more sections which are rotated together or separately and are mounted separately. This has the advantage that the tendency of large balancing valves 20 to flutter is effectively reduced. Furthermore, in an advantageous refinement of the invention, it is also possible to provide a plurality of balancing valves 20 one behind the other, in such a manner that the air manifold volume and therefore also the length of the preintake section can be increased and reduced in a number of steps.

The particular advantage of the induction system according to the invention resides in the combination of the ram pipe and tuned principle. Depending on the position of the balancing valves 20, a single induction system is deliberately used to produce either tuned-intake charging or ram-pipe charging. However, there is no need for a plurality of differently dimensioned ram pipes or air manifolds.

In the illustration shown in FIGS. 1 and 2, the induction system according to the invention is designed, by way of example, for a 4-cylinder engine. However, a corresponding inventive design for engines with any desired number of cylinders is also possible. Therefore, further exemplary embodiments for internal combustion engines 18 with eight cylinders are described below, although this too is to be understood purely as an example providing a better explanation of the principle of the invention.

The induction system according to the invention is also suitable, as mentioned above, for 8-cylinder engines, as shown in FIGS. 3 to 7. In this case, the cylinders of the internal combustion engine 18 are in a double-V arrangement, i.e. in the form of a so-called VR engine. Two air manifolds 14 and 15 are provided, in each case one air manifold 14 being connected to specified cylinders of the internal combustion engine 18 and the other air manifold 15 being connected to the remaining cylinders of the internal combustion engine 18, supplying the cylinders with combustion air via air intakes 29. The preintake length 12 supplies the air manifolds 14 and 15 with combustion air. A balancing valve 20, which is mounted so that it can rotate about a pin 30, is arranged in each of the two air manifolds 14, 15. In addition, in a type of parallel connection in terms of the induction pipes 16, a tuned pipe 32 which connects the two air manifolds 14 and 15 is provided. In the tuned pipe 32 there is a tuned valve 36 which is mounted so that it can rotate about a pin 34 and which optionally, depending on its position, does or does not produce fluid communication between the air manifolds 14 and 15 via the tuned pipe 32. The balancing valves 20 and the tuned valve 36 can be actuated by the drive 28, for example dedicated electric motors, in such a manner the valves 20 and 36 are in either an open or a closed position. Suitably combining the open and closed positions of the valves 20 and 36 results essentially in three different switching states which are described in more detail below with reference to FIGS. 8 to 10.

Figure 3:
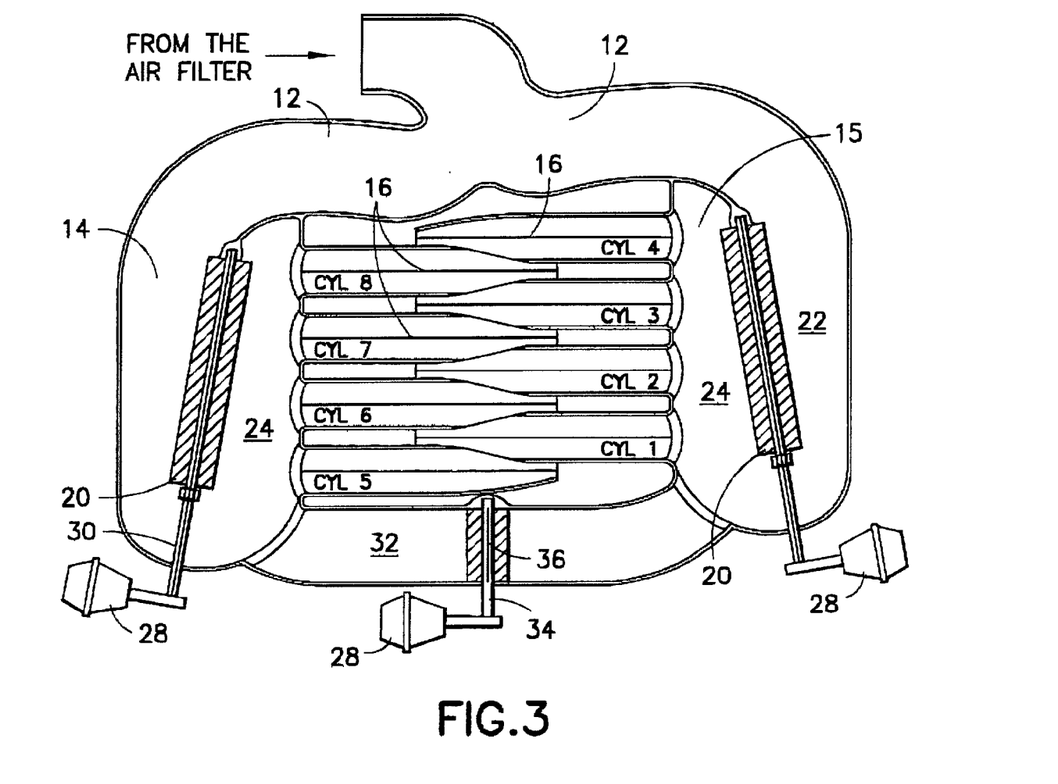
FIG. 3 shows a second preferred embodiment of an induction system according to the invention, in partially sectional plan view.
Figure 4:
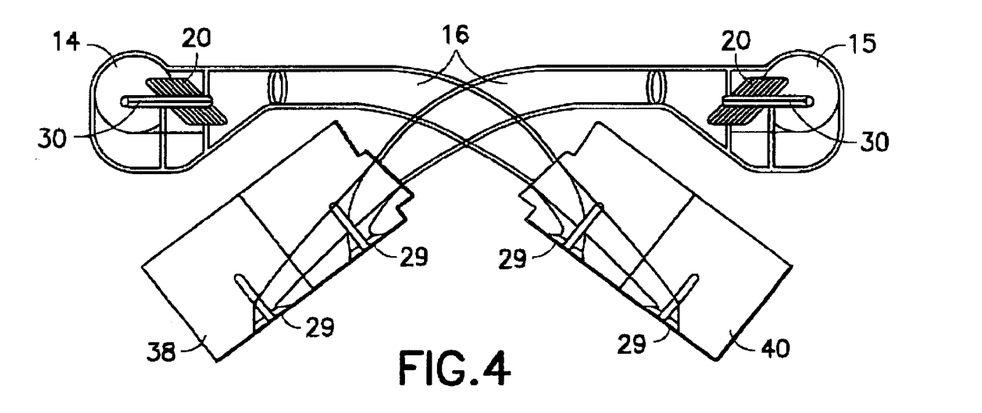
FIG. 4 shows the second preferred embodiment of an induction system according to the invention from FIG. 3, in a cross-sectional illustration.
Figure 5:
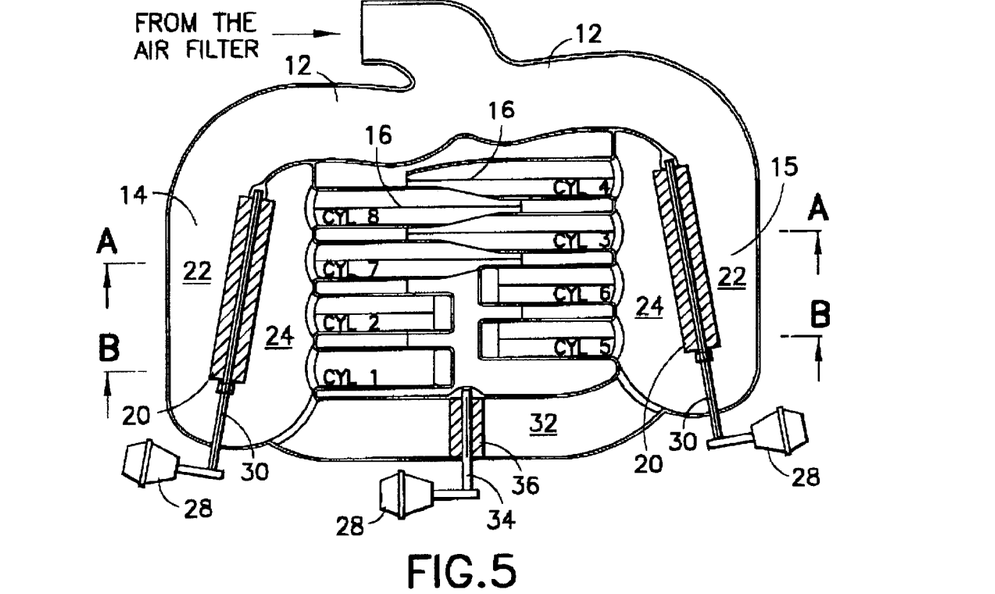
FIG. 5 shows a third preferred embodiment of an induction system according to the invention, in a partially sectional plan view.
Figure 6:
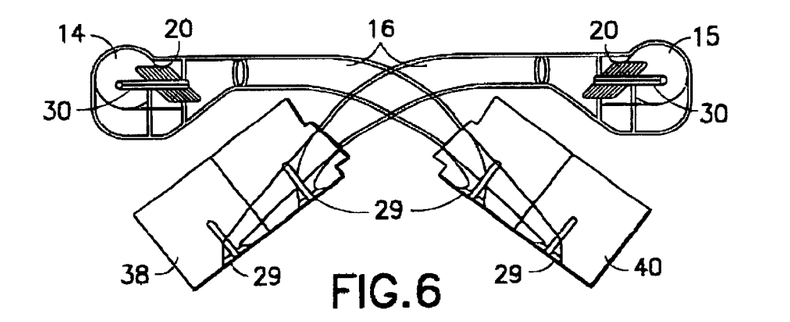
FIG. 6 shows the third preferred embodiment of an induction system according to the invention from FIG. 5, in section on line A—A from FIG. 5.
Figure 7:
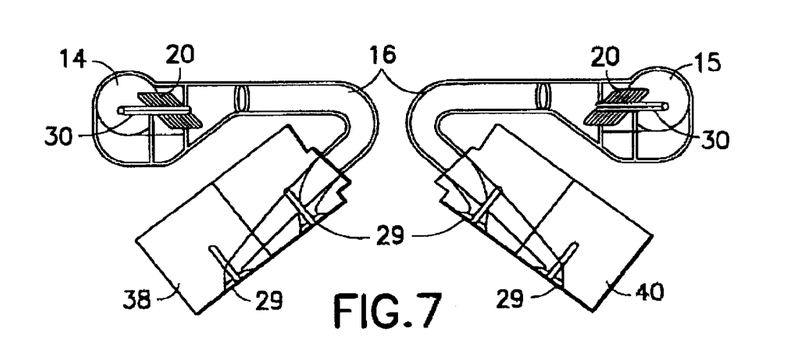
FIG. 7 shows the third preferred embodiment of an induction system according to the invention from FIG. 5, in section on line B—B from FIG. 5.

The essential difference between the two embodiments shown in FIGS. 3 and 4, on the one hand, and FIGS. 5 to 7, on the other hand, is that FIGS. 3 and 4 show an embodiment for an internal combustion engine 18 with a so-called 180° crank angle, while FIGS. 5 to 7 show an embodiment for an internal combustion engine 18 with a so-called 90° crank angle.

This induction pipe design according to the invention shown in FIGS. 3 to 7 is also a combined ram-pipe/tuned-intake system in which the volumes of the manifolds 14 and 15 and the lengths of the corresponding preintake pipes 12 can be switched. The system allows a high delivery level over a wide speed spectrum. To optimize the space required, it can be of very shallow design.

To produce unimpeded induction processes, in the embodiment shown in FIGS. 3 and 4 in each case cylinders with a 180° crank angle spark gap are connected to each of the manifolds 14, 15. For an ignition sequence 1-5-2-6-4-8-3-7 ("180° crankshaft"), the cylinders 1, 2, 3 and 4 and 5, 6, 7 and 8 are each connected to a common manifold 14 or 15 (FIG. 3). This results, for example, in a crossed induction pipe arrangement which is outlined in section in FIG. 4 for all eight cylinders. The air manifold 14 is arranged above a cylinder bank 38 and the corresponding induction pipes 16 run to an opposite cylinder bank 40, above which the other air manifold 15 is arranged. The induction pipes 16 of the latter manifold 15 are in turn connected, in a similar way, to the cylinder bank 38 which lies opposite the air manifold 15.

For the ignition sequence 1-5-7-4-8-3-2-6 ("90° comfort crankshaft") in accordance with the embodiment shown in FIGS. 5 to 7, to ensure that there is no disruption to the induction processes, the cylinders 1, 2, 7 and 8 and the cylinders 3, 4, 5 and 6 have to be supplied from in each case one common air manifold 14, 15 (FIG. 5). For this purpose, by way of example, the induction pipes 16 of the cylinders 1, 2, 5 and 6 are arranged "overhead", as illustrated in FIG. 7, and the induction pipes 16 of the cylinders 3, 4, 7 and 8 are arranged "crossed", as illustrated in FIG. 6.

The switchable change in volume of the air manifolds 14 and 15 using the balancing valves 20 adapts the system oscillation in particular in the lower speed range. For this purpose, by switching, the air manifold volume which is capable of oscillation, in conjunction with the geometry of the preintake length 12 between air manifolds 14, 15 and air filter (not shown in FIGS. 3 to 7), is switched to a tuned system which is capable of oscillation.

Figure 8:
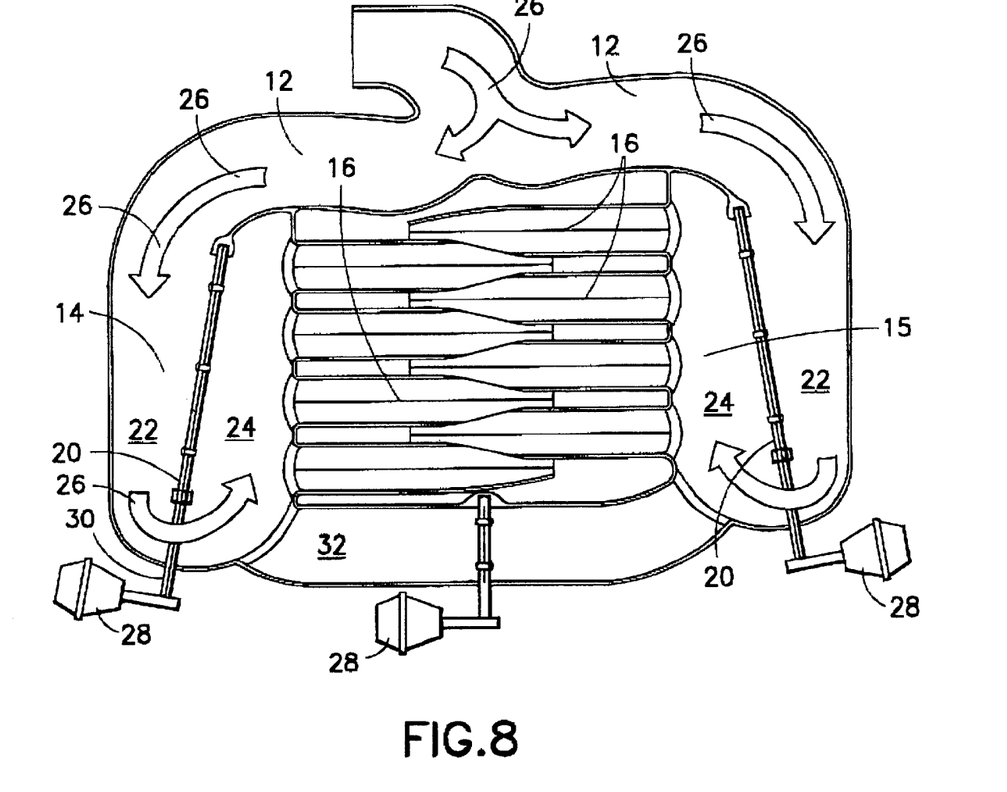
FIGS. 8 to 10 show the second preferred embodiment of an induction system according to the invention from FIG. 3 in partially sectional plan view, in each case in different switching states.

The air manifold volume can be reduced by suitably switching the balancing valves 20, and part of the air manifold volume can be used as a pipe-like extension 22 of the preintake length 12 (FIG. 8). This results in a natural frequency of the oscillation system which is adapted to the lower speeds and is used for tuned-intake charging.

This switchable transverse connection between the two air manifolds 14 and 15 by means of the tuned pipe 32 allows tuned vibration between the two air manifolds 14 and 15. By configuring the tuned pipe length and tuned pipe diameter, the tuned-intake system is adapted to the appropriate engine system. This tuned-intake system is used in particular in the middle speed range in order to optimize the induction pipe oscillation.

When the tuned valve 36 in the tuned pipe 32, which is also referred to as the transverse pipe, is closed, ram-pipe charging is produced by the induction pipes 16 and the air manifold volume. The system is adapted using the induction pipe diameter and induction pipe length and air manifold volume 22, 24 in conjunction with the induction brought about by the cylinders.

Differences in the oscillation lengths of the induction pipes 16 caused by different duct lengths in cylinder heads are balanced by the passage of the induction pipes between the cylinder head and main manifold (not shown in the figures). In engines with a variable camshaft, this status is additionally taken into account, for example by using different intake cam contours. Furthermore, defined pressure losses from the individual induction pipes 16 can be used as a compensating measure.

Figure 9:
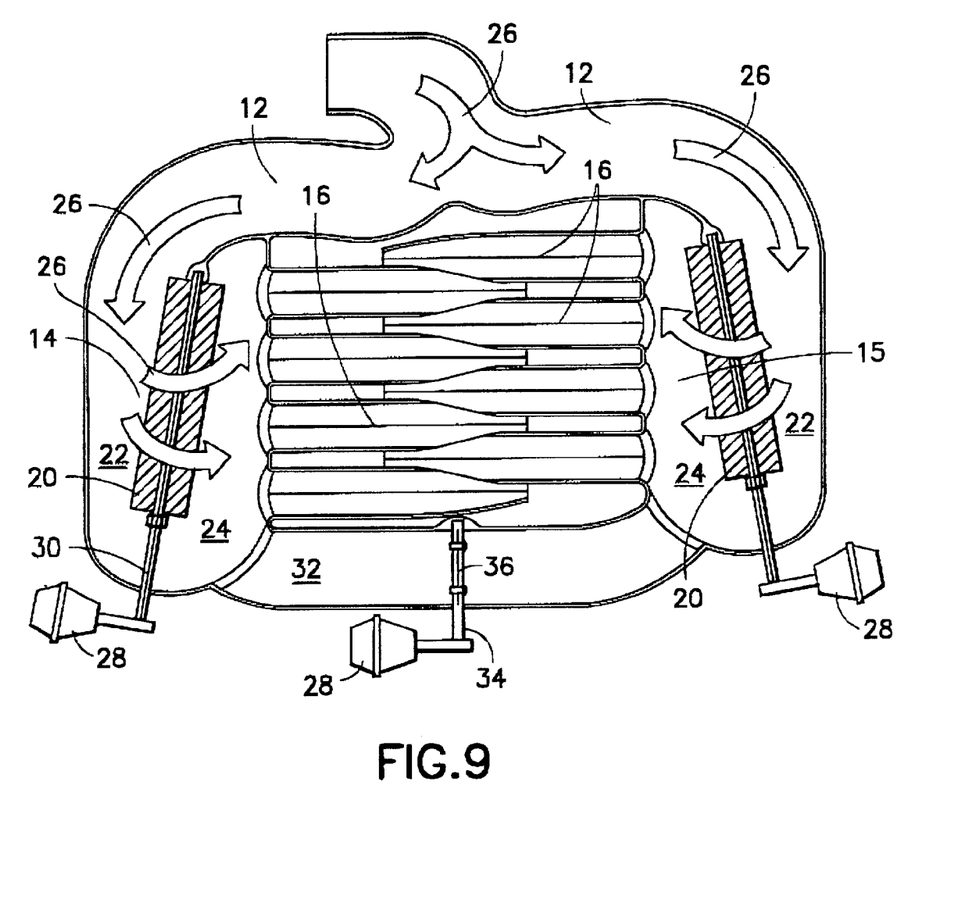
Figure 10:
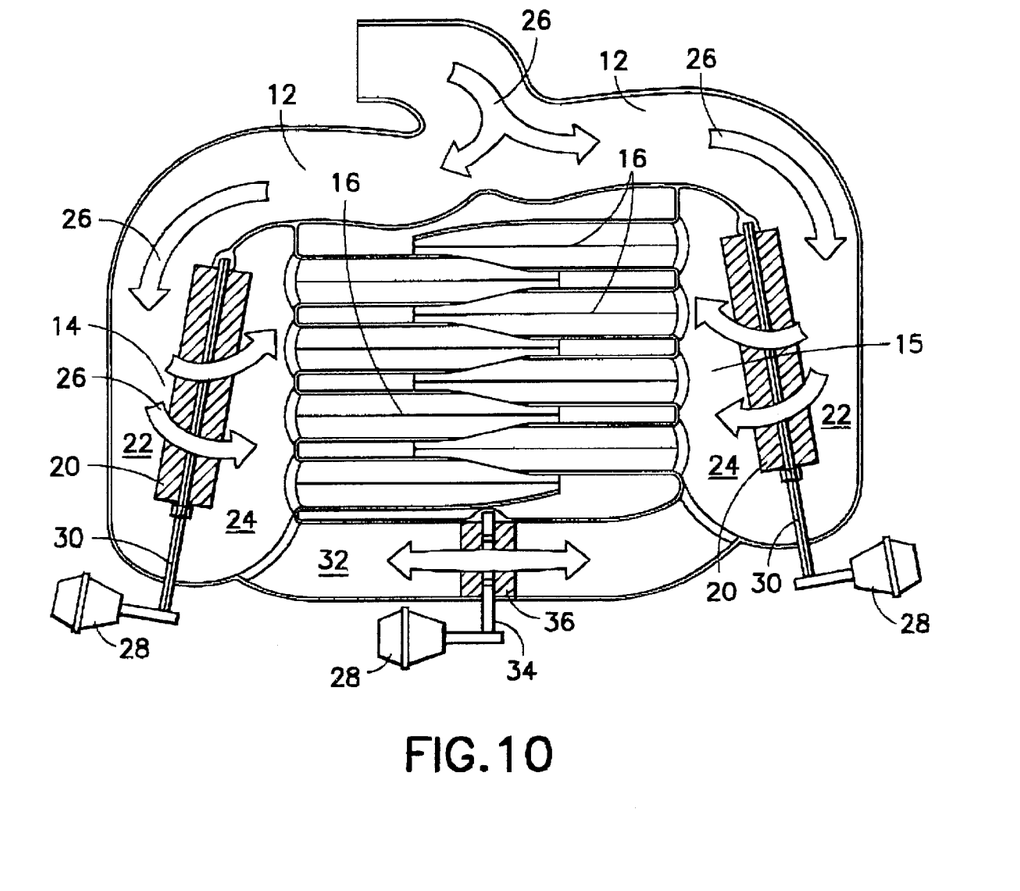

The operating principle of the induction system according to the invention is explained below with reference to FIGS. 8 to 10. FIGS. 8 to 10 show, purely by way of example, partially sectional plan views of the embodiment shown in FIG. 3, but these explanations apply to all embodiments or, where they relate to the additional switching of the tuned valve 36, to all embodiments with at least two air manifolds 14 and 15.

The operating principle of the switching operations which is explained below with reference to the example of the 180° crankshaft (FIG. 3) applies mutatis mutandis to the 90° crankshaft (FIG. 5), in which case the changed passage of the induction pipes (induction pipes of cylinders 1, 2, 7 and 8 and 3, 4, 5 and 6 running to in each case one manifold) are to be taken into account for the ignition sequence of the physical crankshaft.

Switching step 1 (FIG. 8) is used to fill the cylinders in the lower speed range. For this purpose, the manifold volumes are reduced by closing the balancing valves 20, and the filter air intake lengths 12 are extended by the separate air manifold regions 22 and 24. The tuned valve 36 between the air manifolds 14 and 15 remains closed. In engines with a variable camshaft, the intake camshafts are preferably switched to the moment position (early opening times). In this switching position, the reflection of the pressure waves at the air filter system and in the preintake length 12 becomes significant. As a result, a tuned-intake charging is produced in the lower speed range. The part-pipes of the transverse pipe or tuned pipe 32 which is closed by the tuned valve are used as $\lambda/4$ pipes to assist the system oscillation of the air manifold 14, 15.

In switching step 2 (FIG. 9), the manifold volumes are increased by opening the balancing valves 20. The tuned valve 36 is closed. In the case of engines with a variable camshaft, the intake camshafts are preferably in the early position. In this switching position, the reflection of the pressure waves at the air manifold 14, 15 determines the performance of the system. The induction system according to the invention operates using the principle of ram-pipe charging.

In switching step 3 (FIG. 10), the balancing valves 20 and the tuned valve 36 are open. In the case of engines with a variable camshaft, the intake camshafts are preferably in the early position. By opening the tuned valve 36, mass transfer between the air manifolds 14 and 15 becomes possible and tuned oscillation between the two manifolds 14 and 15 is generated. This tuned oscillation is used to increase the cylinder filling in the middle speed range.

In the case of engines with a variable camshaft, it is additionally possible to produce a switching step 4 which, in terms of the position of balancing valves 20 and tuned valve 36, is similar to switching step 2 which is explained above. The entire volume of the air manifolds is available as a result of the balancing valves 20 being opened. Because the tuned valve 36 is closed, direct exchange of pressure between the two air manifolds 14 and 15 is prevented. In addition, however, a late position of the intake camshafts adapts the ram-pipe charging system to upper speed ranges.

By adapting pipe lengths and pipe diameters in the induction system, in combination with the reduction in the volume of the air manifolds and a possible adjustment of intake camshafts, the induction system is adapted to the particular engine configuration.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

What is claimed is:

1. An induction system for supplying an internal combustion engine with combustion air, comprising: at least one separate air manifold; cylinder-specific induction pipes arranged to lead from the air manifold to air intakes of cylinders of the internal combustion engine, the induction pipes being designed as ram pipes for upper speed ranges of the internal combustion engine; and at least one balancing valve arranged in the air manifold, the valve being selectively movable into a closed position in which the valve divides the air manifold to form a long preintake length, and into an open position in which the air manifold has an increased volume instead of a long preintake length, the internal combustion engine having a crankshaft with a 180° crank angle and n cylinders, cylinder 1 to n/2 being connected to a first air manifold via respective induction pipes and the cylinders (n/2+1) to being connected to a second air manifold via respective induction pipes, the balancing valve and. the induction pipes of one of the air manifolds being arranged so that, when the balancing valves closed, there is an increasing induction length for the cylinders which are supplied in each use via the induction pipes as the cylinder number increases.

2. An induction system as defined in claim 1, wherein at least two separate air manifolds are provided.

3. An induction system as defined in claim 2, and further comprising a tuned pipe that connects the two air manifolds together, the tuned pipe having a tuned valve for selectively opening and closing the pipe so that the respective air manifolds are selectively connected to and disconnected from one another via the tuned pipe.

4. An induction system as defined in claim 1, wherein n=4.

5. An induction system as defined in claim 1, wherein n=8 and an ignition sequence for the cylinders 1 to 8 is as follows 1-5-2-6-4-8-3-7.

6. An induction system as defined in claim 1, wherein the cylinders are distributed over at least two cylinder banks, each air manifold being arranged to supply cylinders of one cylinder bank with combustion air, the induction pipes of the first air manifold being arranged to cross the induction pipes of the second manifold.

7. An induction system as defined in claim 6, wherein the cylinders are distributed over two double cylinder banks.

8. An induction system for supplying an internal combustion engine combustion air, comprising: at least one separate air manifold; cylinder-specific induction pipes arranged to lead from the air manifold to air intakes of cylinders of the internal combustion engine, the induction pipes being designed as ram pipes for upper speed ranges of the internal combustion engine; and at least one balancing valve arranged in the air manifold, the valve being selectively movable into a closed position in which the valve divides the air manifold to form a long preintake length, and into an open position in which the air manifold has an increased volume instead of a long preintake length, the internal combustion engine having a crankshaft with a 90° crank angle and n cylinders, in each case n/2 or (n−1)/2 of the cylinders being connected to a first air manifold via respective induction pipes and n/2 or (n+1)/2 cylinders being connected to a second air manifold via respective induction pipes.

9. An induction system as defined in claim 8, wherein n=4.

10. An induction system as defined in claim 8, wherein n=8 and an ignition sequence of the cylinders 1 to 8 is as follows 1-5-7-4-8-3-2-6.

11. An induction system as defined in claim 10, wherein the cylinders 1, 2, 7, 8 are connected to the first air manifold and the cylinders 5, 6, 3, 4 are connected to the second air manifold.

12. An induction system as defined in claim 8, wherein the cylinders are distributed over at least two cylinder banks, the air manifolds being arranged in each case adjacent to one cylinder bank and opposite to the other cylinder bank, some of the induction pipes of the first air manifold being arranged to lead to the opposite cylinder bank so as to cross over the induction pipes of the second air manifold, some of these induction pipes being arranged to lead to the adjacent cylinder bank in an overhead arrangement.

13. An induction system as defined in claim 12, wherein the cylinders are distributed over two double cylinder banks.

* * * * *